(12) United States Patent
Vauchel

(10) Patent No.: US 8,578,698 B2
(45) Date of Patent: Nov. 12, 2013

(54) CASCADE-TYPE THRUST REVERSER FOR JET ENGINE

(75) Inventor: Guy Bernard Vauchel, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 858 days.

(21) Appl. No.: 12/445,437

(22) PCT Filed: Sep. 11, 2007

(86) PCT No.: PCT/FR2007/001459
§ 371 (c)(1),
(2), (4) Date: Feb. 8, 2010

(87) PCT Pub. No.: WO2008/043890
PCT Pub. Date: Apr. 17, 2008

(65) Prior Publication Data
US 2010/0132332 A1 Jun. 3, 2010

(30) Foreign Application Priority Data
Oct. 11, 2006 (FR) ...................................... 06 08891

(51) Int. Cl.
*F02K 1/68* (2006.01)
(52) U.S. Cl.
USPC ...................................... 60/226.2; 244/110 B
(58) Field of Classification Search
USPC ......... 60/226.1, 226.2, 228, 230; 239/265.11, 239/265.23, 265.25, 265.27, 265.29, 239/265.37, 265.39; 244/110 B
See application file for complete search history.

(56) References Cited

U.S. PATENT DOCUMENTS

| | | | | |
|---|---|---|---|---|
| 3,500,645 A | * | 3/1970 | Hom | 60/229 |
| 3,608,314 A | * | 9/1971 | Colley | 60/226.2 |
| 4,147,028 A | * | 4/1979 | Rodgers | 60/226.2 |
| 4,232,516 A | | 11/1980 | Lewis et al. | |
| 5,806,302 A | * | 9/1998 | Cariola et al. | 60/204 |

(Continued)

FOREIGN PATENT DOCUMENTS

| | | |
|---|---|---|
| FR | 1349738 | 1/1964 |
| FR | 2132380 | 11/1972 |
| FR | 2405366 | 5/1979 |

OTHER PUBLICATIONS

International Search Report PCT/FR2007/001459; Dated Mar. 18, 2008.

*Primary Examiner* — Gerald L Sung
*Assistant Examiner* — Scott Walthour
(74) *Attorney, Agent, or Firm* — Brinks Gilson & Lione

(57) ABSTRACT

A fan duct (5) is defined between an inner skin (2) and an outer skin into which the inner skin of the sliding cover (7) is incorporated in the direct-thrust configuration. The inner skin of the sliding cover (7) comprises an annular part extending radially inwards and capable, in the reverse-thrust configuration, of coming to face a larger-diameter annular part of the inner skin (2) of the fan duct (5). The annular part of the sliding cover (7) comprises at least one flap (8) mounted such that it can pivot between the retracted position and a deployed position in which a front part (8a) of the flap (8), upstream of its middle axis (9) about which it is articulated, projects into the fan duct (5). Translational stop means (11) are provided in order, in the reverse thrust position, to act on a rear part (8b) of the flap (8) in such a way as to cause the flap (8) to pivot into the deployed position to close off the fan duct (5).

11 Claims, 6 Drawing Sheets

(56) References Cited

U.S. PATENT DOCUMENTS

| | | |
|---|---|---|
| 2001/0010148 A1 | 8/2001 | Michel et al. |
| 2002/0124550 A1 * | 9/2002 | Stretton ........................ 60/226.2 |
| 2003/0056493 A1 | 3/2003 | Jannetta et al. |

* cited by examiner

CASCADE-TYPE THRUST REVERSER FOR JET ENGINE

FIELD OF THE INVENTION

The present invention relates to cascade-type (cascades of vanes) thrust reversers for jet engines and more specifically relates to what are known as natural cascade-type reversers.

BACKGROUND OF THE INVENTION

As illustrated in FIG. 1 of the attached drawings, a cascade-type thrust reverser 3 such as this, of the type known as the natural type, generally comprises a cowling 1 in which there is formed an opening equipped with cascades 6 (of vanes) which, when the gases are in the direct-thrust situation, is closed by a sliding cowl 7 (see the upper half of FIG. 1) and which, in the thrust-reversal situation, is uncovered by a downstream (with reference to the direction in which the gases flow) translational movement of the sliding cowl 7 (see the lower half of FIG. 1).

A fan duct 5 is defined between an inner skin 2 (a cowl surrounding the engine) and an outer skin into which the inner skin of the sliding cowl 7 fits in the direct-thrust situation.

The inner skin of the sliding cowl 7 comprises an annular part extending radially inward and capable, in a thrust-reversal situation, of butting against a larger-diameter annular part (which forms a hump) of the inner skin 2 of the fan duct in order more or less, and in a "natural" way, to block the cold stream passing through the fan duct 5 with a view to deflecting it forward through the opening that has the vanes 6.

For more details regarding this type of reverser, reference may be made to patent documents FR 2 132 380, FR 1 349 738 and U.S. Pat. No. 4,232,516.

The annular "hump" of the cowl 2 surrounding the engine means that the nacelle has to have aerodynamic lines that encompass large diameters, whereas aircraft manufacturers would prefer increasingly short landing gear which entails reducing the diameter of nacelles carried under the wing.

Furthermore, the aerodynamic lines of the nacelle may sometimes fail to leave the annular hump of the cowl 2 a space close enough to the upstream part of the fixed structure 4 of the reverser (bearing in mind the fact that the maximum retraction travel of the sliding cowl 7 is relatively limited). What this means is that the sliding cowl 7 has to retract a long way, often beyond the length of the cascade vanes 6 which length is itself limited by the fine lines of the sliding cowl 7 in the direct-thrust situation.

Finally, the aerodynamic lines at the downstream part of the siding cowl 7 are often very tapered in order not to encroach too far into the radial volume of the nacelle, and "sandwich" structures to provide optimal sound-deadening cannot be included.

BRIEF SUMMARY OF THE INVENTION

The present invention to overcomes these disadvantages by proposing a thrust reverser of the aforementioned type in which the aerodynamic lines of the inner skin of the fan duct are more similar to those known in cascade-type thrust reversers of the type known as "conventional", so that nacelle casings compatible with manufacturer requirements can be employed.

To this end, one subject of the invention is a cascade-type thrust reverser with cascade vanes for a jet engine, comprising a cowling in which there is formed an opening which, when the gases are in the direct-thrust situation, is closed by a sliding cowl and which, in the thrust-reversal situation, is uncovered by a downstream, with respect to the direction in which the gases flow through the engine, translational movement of the sliding cowl, a fan duct being defined between an inner skin and an outer skin into which the inner skin of the sliding cowl fits in the direct-thrust situation, the inner skin of the sliding cowl comprising an annular part extending radially inward and able, in the thrust-reversal situation, to come to face a larger-diameter annular part of the inner skin of the fan duct, and in which said annular part of the inner skin of the sliding cowl comprises at least one flap mounted to pivot about a substantially central axis of rotation, between a position in which it is retracted into the inner skin of the sliding cowl and a deployed position in which a front part of the flap, upstream of its central axis of rotation, projects into the fan duct, and translational movement halting means are provided to, in the thrust-reversal situation, act on a rear part of the flap, downstream of its central axis of rotation, so as to cause the flap to pivot into its deployed position to block off the fan duct.

By virtue of these arrangements, the aerodynamic lines of the inner skin of the fan duct are softened by a reduction in the size of its annular "hump", this reduction being compensated for by the use, in the thrust-reversal situation, of small flaps that deploy in order to block off the fan duct under the action of translational-movement halting means on a rear part of the flap downstream of its central axis of rotation.

Mechanical or elastic means may advantageously be provided to, in the direct-thrust situation, return the flap to its retracted position.

In one embodiment, the larger-diameter annular part of the inner skin of the fan duct comprises a stop member, preferably of an aerodynamic shape, and capable, in the thrust-reversal situation, of butting against the rear part of the flap and of causing the latter to pivot into its deployed position.

The stop member advantageously has a surface for sliding or rolling contact with the rear part of the flap, so as to reduce or eliminate friction.

The stop member may also have an opening which, depending on whether it is directed upstream or downstream, forms either an engine cooling air intake or an engine air outlet.

According to one advantageous possibility, the cowling has a stop element to, in the direct-thrust situation, act as an obstacle to the movement of the rear part of the flap and immobilize the flap in the retracted position. This stop member advantageously has a surface for sliding or rolling contact with the rear part of the flap, so as to reduce or eliminate friction.

In another embodiment, the rear part of the flap is articulated to a first end of at least one link rod of which a second end is mounted to slide upstream to downstream in a slideway that has a downstream translational-movement halting end designed to, during thrust reversal, immobilize the second end of the link rod so that, at the end of the travel of the sliding cowl in the downstream direction, the flap pivots into the deployed position.

In yet another embodiment, the rear part of the flap is articulated to a first end of at least one telescopic link rod with slider, which link rod is articulated by a second end to a fixed structure upstream of the reverser, and the length of said link rod with slider in its maximum extension is determined such that, at the end of the travel of the sliding cowl in the downstream direction, the flap pivots into the deployed position.

These last two forms of embodiment have the advantage of having no obstacle (stop member) in the fan duct in the direct-thrust situation.

According to an alternative form of embodiment, the link rod is mounted articulated about a fixed point situated downstream of the cascade vanes.

According to yet another embodiment of the invention, the rear part of the flap has a pivot element able to collaborate during translational movement of the moving cowl with a ramp mounted fixedly on a rear surround of the cascade vanes so as to cause said flap to pivot as the moving cowl retreats.

Another subject of the invention is a jet engine nacelle comprising a natural cascade-type thrust reverser as defined hereinabove.

BRIEF DESCRIPTION OF THE FIGURES

In any event, the invention will be better understood and further features will become apparent from reading the detailed description given hereinafter by way of non-exhaustive illustration with reference to the attached drawings in which.

DETAILED DESCRIPTION OF THE INVENTION

Figure 1:
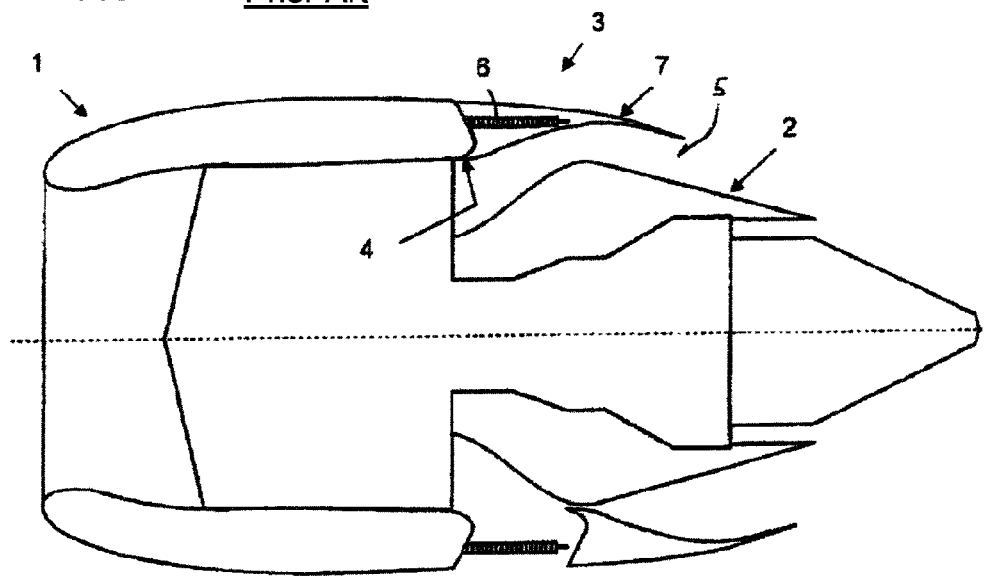
FIG. 1 (already discussed) is a schematic view in longitudinal section of a "natural" cascade-type thrust reverser of known type.

Those elements shown in FIGS. 2 to 11 which are similar to elements of FIG. 1 are denoted by the same numerical references as were used in FIG. 1.

The thrust reverser 3 of FIGS. 2 to 11 essentially differs from the one depicted in FIG. 1 in that the diameter of the annular "hump" of the cowl 2 surrounding the engine is appreciably smaller such that, in the thrust-reversal situation, it simply comes to face the annular part, extending radially inward, of the inner skin of the sliding cowl 7 (without contact therewith).

Figure 2:
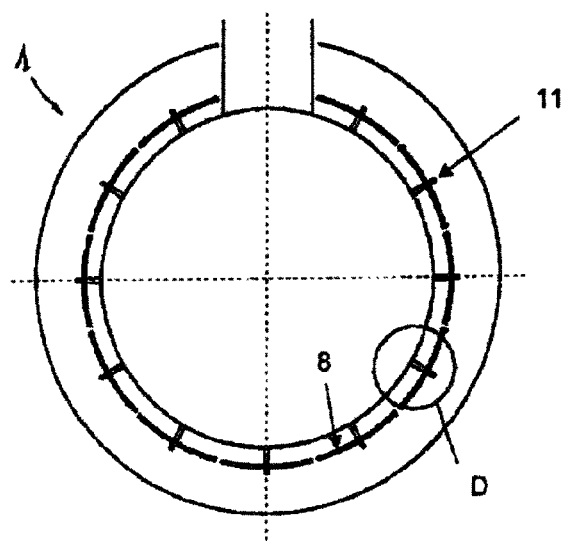
FIG. 2 is a view in cross section of a thrust reverser according to a first embodiment of the invention.

This annular part of the inner skin of the sliding cowl 7 comprises a plurality of pivoting flaps 8 distributed about its circumference (see FIG. 2). The number, the size, and the envelope of the flaps 8 are defined according to the desired reversal performance.

Figure 3:
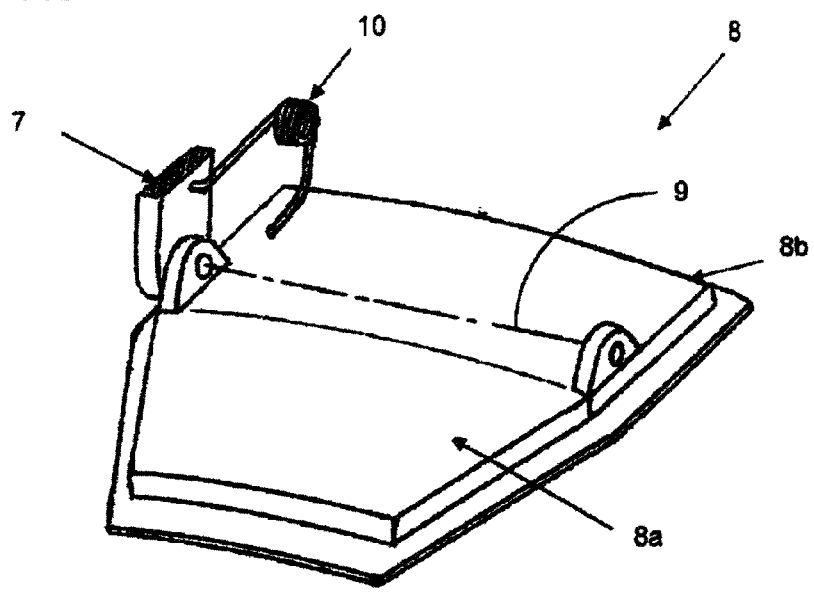
FIG. 3 is a schematic perspective view of a detailed part of FIG. 2, namely a flap.
Figure 4:
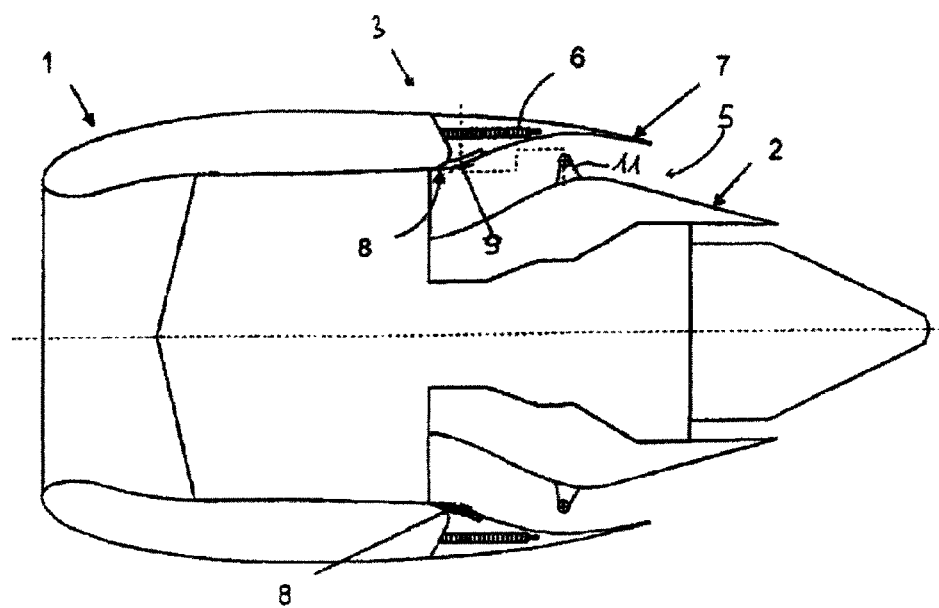
FIG. 4 is a view similar to FIG. 1 of the reverser of FIG. 2 in the direct-thrust situation.
Figure 5:
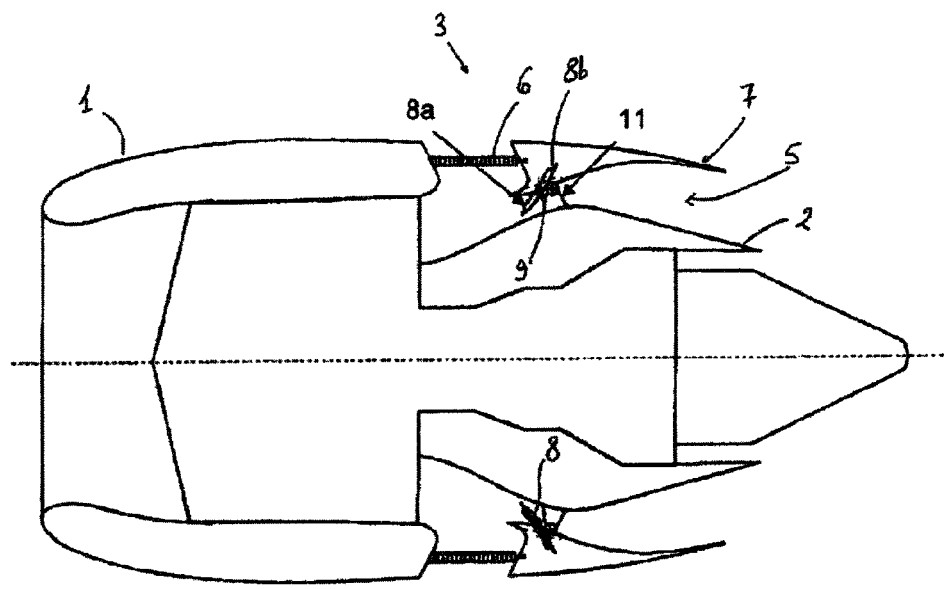
FIG. 5 is a view similar to FIG. 4 in the reverse-thrust situation.

One example of a flap 8 is illustrated in detail in FIG. 3. The flap 8 is mounted to pivot about a central axis 9 of rotation, between a position in which it is retracted into the inner skin of the sliding cowl 7 and a deployed position in which a front part 8a of the flap 8, situated upstream of its central axis 9 of rotation, projects into the fan duct 5 toward the axis of the engine.

The flap 8 is elastically returned to the retracted position by an elastic system, here represented by a torsion spring 10 mounted about the axis 9 of rotation of the flap 8.

In a first embodiment illustrated in FIGS. 4 to 8, the annular hump of the cowl 2 comprises a stop member 11 of aerodynamic shape designed to, in the thrust-reversal situation, butt against a rear part 8b of the flap 8 which is situated downstream of its central axis 9 of rotation.

As soon as the sliding cowl 7 has retracted by a predetermined distance, the rear part 8b of the flap 8 comes into contact with the stop member 11. As the sliding cowl 7 continues to be retracted, the flap 8 pivots about its central axis 9 into a deployed position (see FIG. 5) so as to block off the fan duct 5.

The stop member 11 is of an aerodynamic shape in order to minimize the impact it has, by way of an obstacle, on performance in direct-thrust mode.

Figure 6:
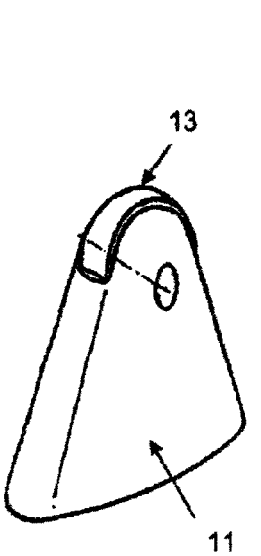
FIG. 6 is a schematic perspective view of a detailed part of FIGS. 2 to 5, namely a flap stop member.

The stop member 11 is illustrated in detail in FIG. 6. At the upper part, it has a surface 13 for rolling contact with the rear part 8b of the flap 8 so as to avoid friction.

The rolling surface 13 is designed to resist the wear and deformation which are caused by repeated use in a highly vibrational environment.

Figure 7:
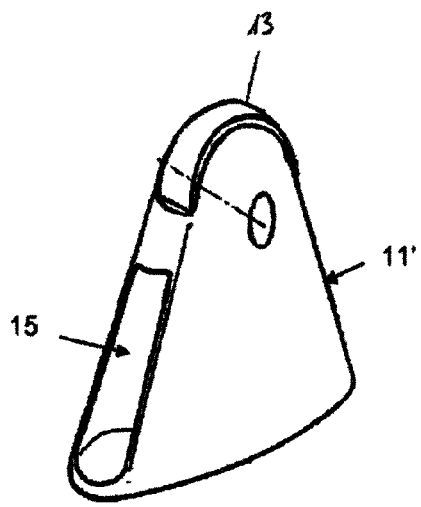
FIG. 7 is a view similar to FIG. 6 of an alternative form of embodiment of the flap stop.

An alternative form of embodiment 11' of this stop member is illustrated in detail in FIG. 7. The stop member 11' differs from the previous one in that it has an opening 15 which, depending on whether it is directed upstream or downstream, forms an engine cooling air intake or an engine air outlet.

Figure 8:
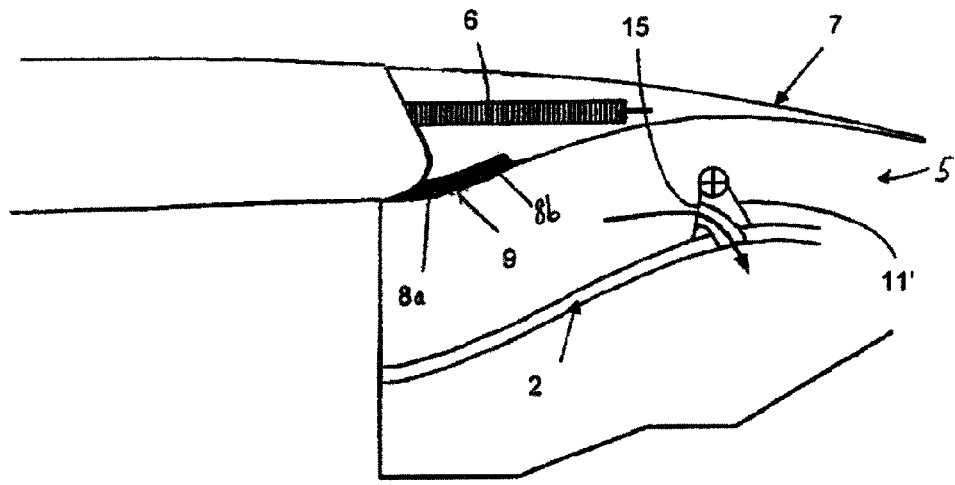
FIG. 8 is a view similar to the upper half of FIG. 4 and illustrating the behavior of the flap stop of FIG. 7.

FIG. 8 shows how the stop member 11' behaves in the direct-thrust situation when its opening 15 is directed upstream and it therefore forms an engine cooling air inlet intake scoop.

All that is required is for the stop member 11' to be pivoted through 180° to direct the opening 15 in the downstream direction whereupon it forms an air outlet in the engine cowl 2. The speed of the secondary or bypass flow negotiating the aerodynamic shapes of the stop member 11' assists with extraction.

The reverser 3 behaves like a "conventional" natural reverser in transit, namely, while the sliding cowl 7 is retracting, the uncovered cross section of the opening in the cowling 1, associated with the passage cross section in direct-thrust mode is never smaller than the upstream air inlet cross section of the nacelle.

Figure 9:
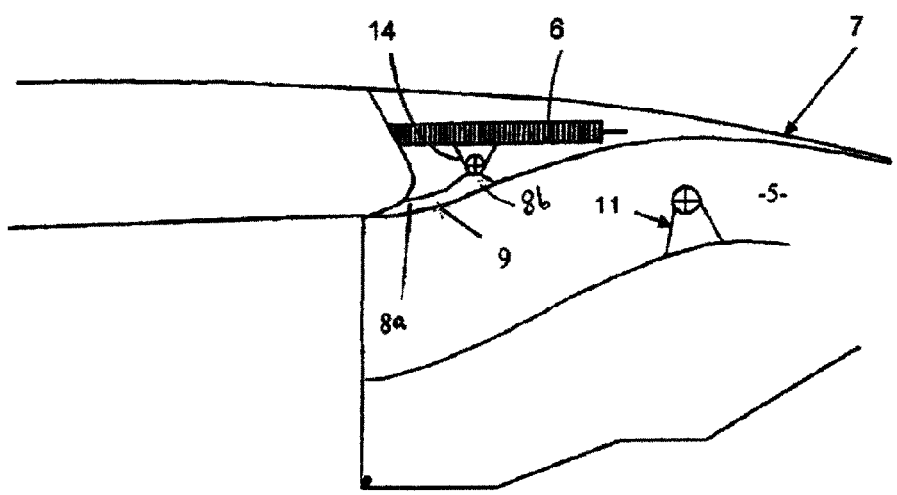
FIG. 9 is a view similar to FIG. 8 depicting another alternative form of embodiment comprising a stop to immobilize the flap in the retracted position.

FIG. 9 illustrates another embodiment in which the cowling 1 has a stop element 14 designed to, in the direct-thrust situation, act as an obstacle to the movement of the rear part 8b of the flap 8 and immobilize the flap 8 in the retracted position.

In this instance, the stop element 14 is installed in the region of the cascade vanes 6 and, in the direct-thrust situation, the rear part 8b of the flap 8 is in permanent contact with the stop element 14.

The stop element 14 also has a surface for rolling contact with the rear part 8b of the flap 8 in order to avoid friction.

Figure 10:
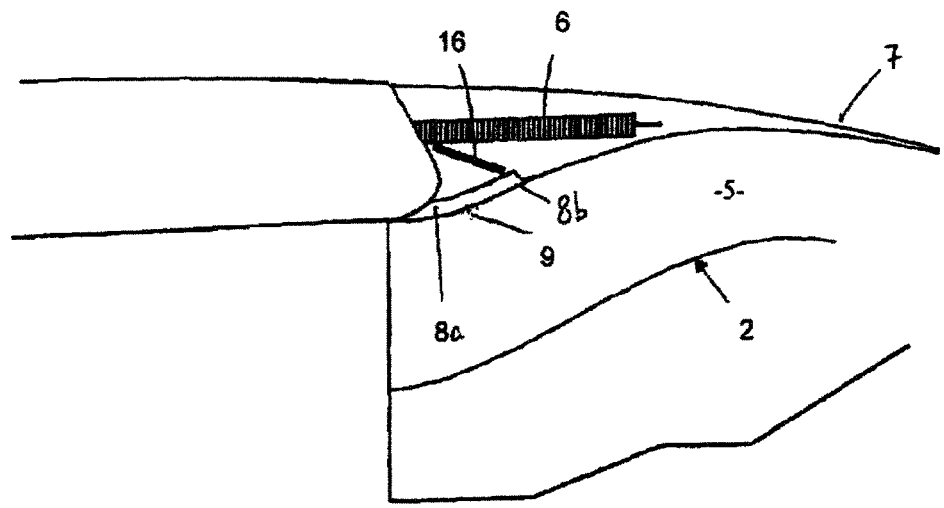
FIG. 10 is a view similar to FIGS. 8 and 9 depicting another embodiment of the invention.
Figure 11:
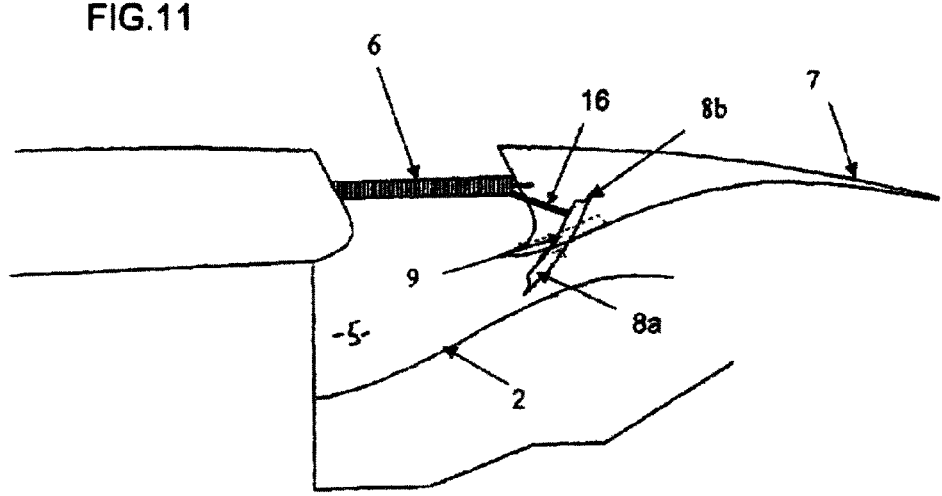
FIG. 11 is a view similar to FIG. 10 in the thrust-reversal situation.

FIGS. 10 and 11 illustrate yet another embodiment in which the fan duct 5 has no aerodynamic obstacle (that is to say, in particular, does not have any stop member on the engine cowl 2) in the direct-thrust situation.

The rear part 8b of the flap 8 is articulated to a first end of a link rod 16. A second end of the link rod 16 is mounted to slide upstream to downstream in a slideway (not depicted) that may form part of the cascades 6 assembly.

This slideway has a translational movement halting downstream end designed to, during thrust-reversal, immobilize the second end of the link rod 16 once the sliding cowl 7 has refracted by a predetermined distance.

As the sliding cowl 7 continues its retraction travel, the first end of the link rod 16 therefore pulls on the rear part 8b of the flap 8 which pivots and reaches the deployed position when the sliding cowl 7 is at the end of its travel.

Whether in the direct-thrust situation or the reverse-thrust situation, the link rod 16 holds the flap 8, preventing any vibrational effect by forcing the flap 8 into its extreme positions. A mechanism for adjusting the means of attachment of the link rod 16 may be associated with this assembly.

The link rod 16 may be mounted not so that it moves in a slideway but so that it is articulated about a fixed point situated downstream of the cascade and cause the flap to pivot as the moving cowl retracts through pivoting of said link rod about its pivot.

Figure 12:
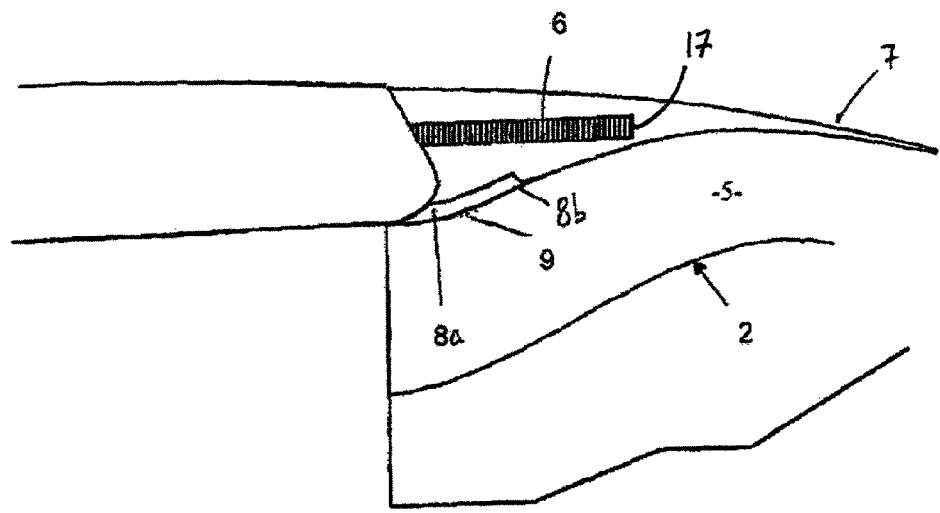
FIGS. 12 and 13 depict another way of driving the flap into the direct-jet and thrust-reversal positions respectively.
Figure 13:
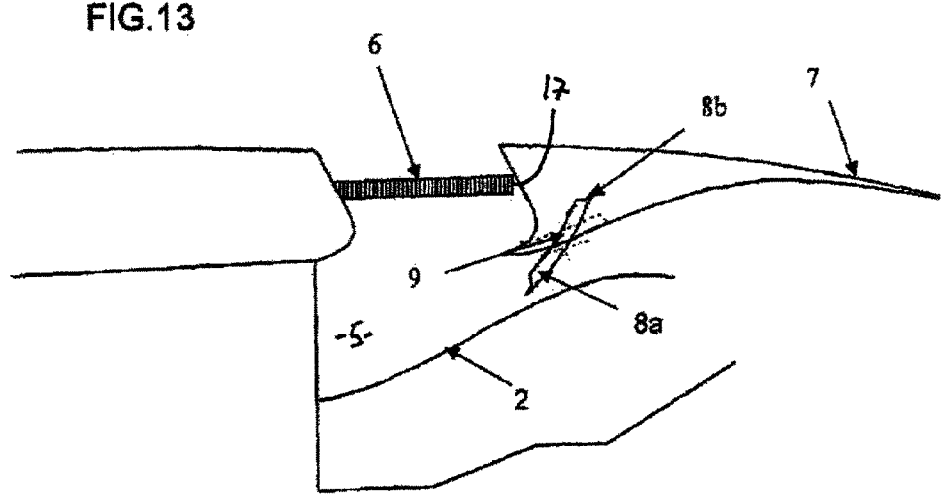

FIGS. 12 and 13 show a third example of how the flaps 8 are moved without using a stop mounted on the cowl surrounding the engine.

To do this, the rear cascade vane surround 17 comprises a suitable ramp, which may be an integral part thereof or attached thereto, which, as the moving cowl 7 retracts, acts upon a pivot element, associated with the flap 08, capable of supporting a system that assists with rolling, such as roller. The ramp and pivot element combination makes it possible to position a flap which, at the end of the retraction of the moving cowl 7, blocks off all or part of the duct 5, depending on the desired reversal effectiveness.

The invention therefore offers great thrust-reversal effectiveness while at the same time optimizing the external size of the nacelle so that it can be accommodated under an airplane wing.

Although the invention has been described using particular exemplary embodiments, it is quite obvious that it is not in any way restricted thereto and that it comprises all the technical equivalents of the means described together with combinations thereof where these fall within the scope of the invention.

The invention claimed is:

1. A cascade type thrust reverser with cascade vanes for a jet engine, comprising a cowling in which there is formed an opening which, when gases are in a direct-thrust situation, is closed by a sliding cowl and which, in a thrust reversal situation, is uncovered by a downstream, with respect to a direction in which the gases flow through the engine, translational movement of the sliding cowl, a fan duct being defined between an inner skin and an outer skin into which an inner skin of the sliding cowl fits in the direct thrust situation, the inner skin of the sliding cowl comprising an annular part extending radially inward and able, in the thrust reversal situation, to come to face a larger diameter annular part of the inner skin of the fan duct, wherein said annular part of the inner skin of the sliding cowl comprises at least one flap mounted to pivot about a substantially central axis of rotation, between a position in which it is retracted into the inner skin of the sliding cowl and a deployed position in which a front part of the flap, upstream of its central axis of rotation, projects into the fan duct, and in that translational movement halting means are provided to, in the thrust reversal situation, act on a rear part of the flap, downstream of its central axis of rotation, so as to cause the flap to pivot into its deployed position to block off the fan duct.

2. The thrust reverser as claimed in claim 1, wherein mechanical or elastic means are provided to, in the direct thrust situation, return the flap to its retracted position.

3. The thrust reverser as claimed in claim 1, wherein the larger diameter annular part of the inner skin of the fan duct comprises a stop member of an aerodynamic shape, and capable, in the thrust reversal situation, of butting against the rear part of the flap and of causing the latter to pivot into its deployed position.

4. The thrust reverser as claimed in claim 3, wherein the stop member has a surface for sliding or rolling contact with the rear part of the flap.

5. The thrust reverser as claimed in claim 3, wherein the stop member has an opening which, depending on whether it is directed upstream or downstream, forms either an engine cooling air intake or an engine air outlet.

6. The thrust reverser as claimed in claim 1, wherein the cowling has a stop element designed to, in the direct thrust situation, act as an obstacle to movement of the rear part of the flap and immobilize the flap in the retracted position.

7. The thrust reverser as claimed in claim 6, wherein the stop member has a surface for sliding or rolling contact with the rear part of the flap.

8. The thrust reverser as claimed in claim 1, wherein the rear part of the flap is articulated to a first end of at least one link rod of which a second end is mounted to slide upstream to downstream in a slideway that has a downstream translational movement halting end designed to, during thrust reversal, immobilize the second end of the link rod so that, at an end of the travel of the sliding cowl in the downstream direction, the flap pivots into the deployed position.

9. The thrust reverser as claimed in claim 1, wherein the rear part of the flap is articulated to a first end of at least one telescopic link rod with slider, which link rod is articulated by a second end to a fixed structure upstream of the reverser, and in that a length of said link rod with slider in its maximum extension is determined such that, at an end of a travel of the sliding cowl in the downstream direction, the flap pivots into the deployed position.

10. The thrust reverser as claimed in claim 9, wherein the link rod is mounted articulated about a fixed point situated downstream of cascade vanes.

11. A jet engine nacelle comprising a cascade type thrust reverser as claimed in claim 1.

* * * * *

UNITED STATES PATENT AND TRADEMARK OFFICE
CERTIFICATE OF CORRECTION

PATENT NO.      : 8,578,698 B2
APPLICATION NO. : 12/445437
DATED           : November 12, 2013
INVENTOR(S)     : Guy Bernard Vauchel Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1158 days.

Signed and Sealed this
Twenty-second Day of September, 2015

Michelle K. Lee
*Director of the United States Patent and Trademark Office*